United States Patent [19]

Harms

[11] Patent Number: 4,641,932

[45] Date of Patent: Feb. 10, 1987

[54] PROTECTIVE LENS COVER FOR OPTICAL MEANS

[76] Inventor: Wolfgang Harms, 209 Harvest Rd., Cherry Hill, N.J. 08002

[21] Appl. No.: 744,279

[22] Filed: Jun. 13, 1985

[51] Int. Cl.$^4$ .................. G02B 23/18; G03B 11/04; B65D 55/16
[52] U.S. Cl. ................................. 350/587; 220/375; 215/306
[58] Field of Search ............... 350/587, 579, 580, 578; 215/306; 220/375

[56] References Cited

U.S. PATENT DOCUMENTS

| | | | |
|---|---|---|---|
| 2,291,821 | 8/1942 | McNabb | 350/587 |
| 2,958,439 | 11/1960 | Yochem | 220/375 |
| 3,145,872 | 8/1964 | Hayes | 220/375 |
| 4,327,960 | 5/1982 | Gould | 350/587 |

FOREIGN PATENT DOCUMENTS

| | | | |
|---|---|---|---|
| 2296863 | 7/1976 | France | 350/587 |
| 10263 | of 1915 | United Kingdom | 350/587 |

OTHER PUBLICATIONS

"Steiner Binoculars", advertisement, distributed by Pioneer & Co., Westmont, N.J., 8 pages.
Fujinon Binocular advertisement, Fujinon Inc., Scarsdale, N.Y., 1 page.

*Primary Examiner*—Jon W. Henry
*Attorney, Agent, or Firm*—Jacob Trachtman

[57] ABSTRACT

A protective cover for optical means, such as binocular optical means, having a pair of exposed lens portions which are spaced apart, comprising first and second cover bodies, each having a lens cap portion for being removably secured over a lens portion of the binoculars. Each of the cover bodies has a connecting portion extending from its cap portion. An attachment means is provided for securing the connecting portions of the bodies to the binoculars at a location intermediate its lens portions. The attachment means allows movement of each of the cap portions between a first position proximate to one of the lens portions and a second position away from and intermediate the lens portion of the binoculars. The attachment means urges each of the bodies towards its second position upon being displaced therefrom, so as to avoid interfering with the binoculars when in use.

8 Claims, 5 Drawing Figures

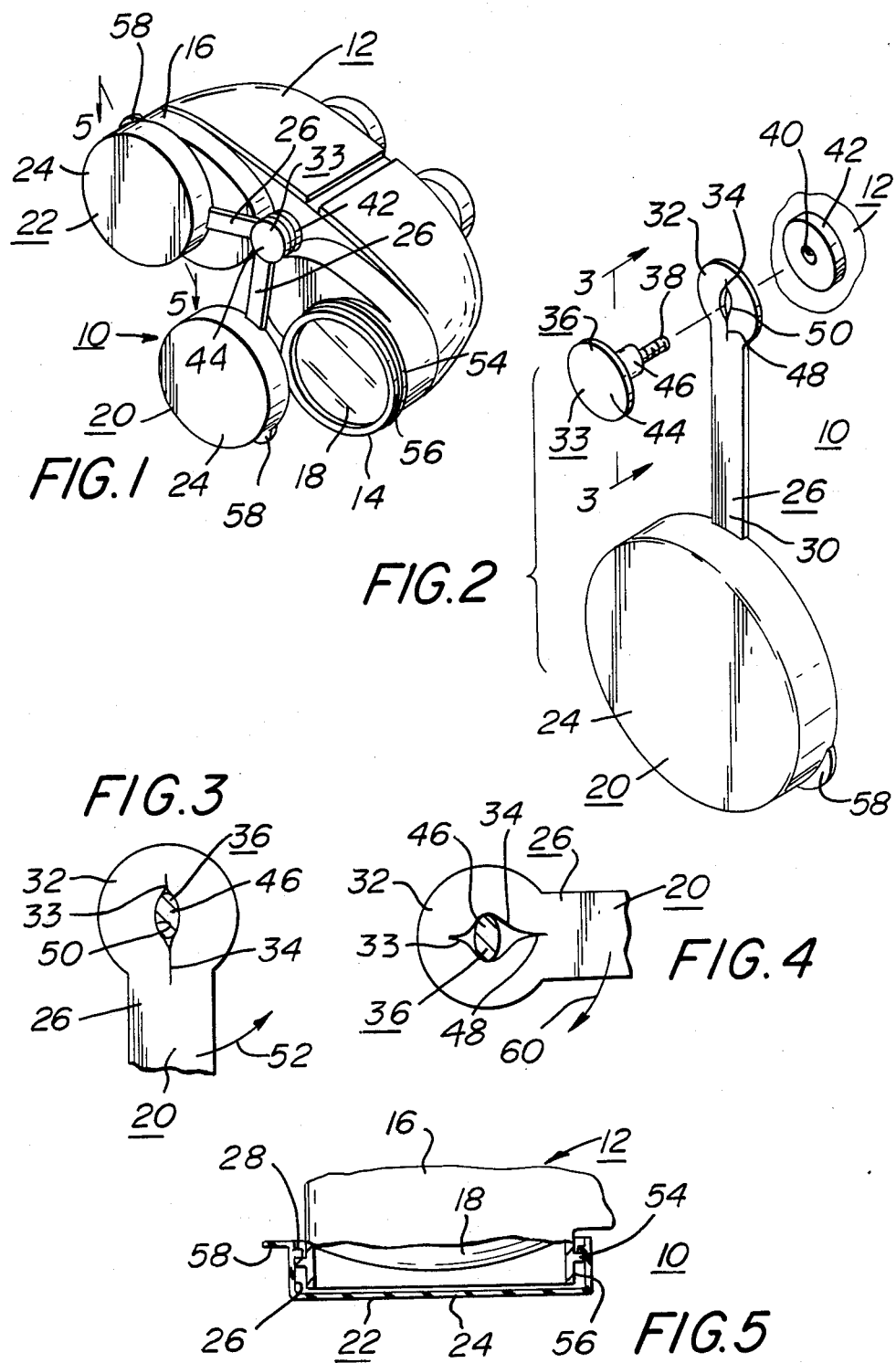

PROTECTIVE LENS COVER FOR OPTICAL MEANS

BACKGROUND OF THE INVENTION

The invention relates to a protective lens cover for optical means, and more particularly to a cover for protecting exposed binocular lenses.

Heretofore, optical means have been provided with lens covers for protecting their lenses which were easily lost, or misplaced and were not readily accessible. Where such lens caps have been provided with retaining means, their orientations and movements have not been controlled, so that they were free to interfere with the use of the optical instrument. This is especially true for optical means such as binoculars which may require rapid movement and positioning during use resulting in the uncontrolled movement of the retained lens caps.

SUMMARY OF THE INVENTION

It is therefore a principal object of the invention to provide a new and improved protective lens cover for optical means having retaining means controlling its position when not in use to avoid interference with the optical means.

Another object in the invention is to provide a new and improved protective lens cover which may readily be applied and removed from the optical portion of the optical instrument.

Another object of the invention is to provide a new and improved protective lens cover for optical means such as binoculars in which the protective cover is retained in a position intermediate the lenses to avoid interference therewith.

Another object of the invention is to provide a new and improved protective lens cover for optical means which is retained by the optical means and may be readily applied and removed for protecting and sealing the lens portion of the optical means.

Another object of the invention is to provide a new and improved protective lens cover for optical means which is simple in operation and construction, and may readily be produced.

Another object of the invention is to provide a new and improved protective lens cover for optical means which is inexpensive to manufacture and maintain in operation.

The above objects and advantages of the invention are achieved by providing a protective lens cover for optical means, such as binocular optical means, having a pair of exposed lens portions which are spaced apart. The protective lens cover comprises first and second cover bodies, each having a lens cap portion for being removably secure over a lens portion of the binoculars. Each of the cover bodies has a connecting portion extending from its cap portion. An attachment means is provided for securing the connecting portions of the bodies to the binoculars at a location intermediate its lens portions. The attachment means allows movement of each of the cap portions between a first position proximate to one of the lens portions and a second position away from and intermediate the lens portions of the binoculars. The attachment means urges each of the bodies towards its second position upon being displaced therefrom, so as to avoid interfering with the binoculars when in use.

The attachment means comprises an elongated opening in the second end portion of each of the connecting portions of the cover bodies and a retaining screw secured with the optical means.

The retaining screw has an intermediate portion with an elongated cross-section which is received through the elongated openings of the connecting portions, so that the elongated cross-section of the retaining screw is in alignment with the elongated openings of the connecting portions of the bodies when the bodies are in their second positions. This arrangement urges each of the cover bodies towards its second position when it is displaced therefrom.

The cover bodies are made of a resilient material and when their cap portions are received over a respective lens portion of the binoculars, they form a seal therewith. The cap portions are each provided with a tab for assisting in the breaking of the seal and in the removal of each of the cap portions from lens portion of the binoculars.

BRIEF DESCRIPTION OF THE DRAWING

The foregoing and other objects of the invention will become more apparent as the following detailed description is read in conjunction with the drawing, in which:

FIG. 1 is a perspective view of an optical means in the form of binoculars illustrating a protective cover embodying the invention, FIG. 2 is an enlarged exploded view of a portion of the protective cover shown in FIG. 1, FIG. 3 is an enlarged sectional view taken on line 3—3 of FIG. 2, FIG. 4 is a view similar to that of FIG. 3 with the connecting portion of the cover body rotated 90 degrees, and FIG. 5 is an enlarged sectional view taken on the line 5—5 of FIG. 1.

Like reference numerals designate like parts throughout the several views.

DETAILED DESCRIPTION

Referring to the figures, a protective cover 10 of the invention is shown for an optical system 12, such as the binoculars illustrated in FIG. 1, having a pair of lens portions 14, 16 with exposed lenses 18 which are spaced apart from each other. The protective cover 10 comprises a pair of cover bodies 20 and 22 made of a resilient and flexible material, such as rubber or neoprene. Each cover body 20, 22 has a lens cap portion 24 for being removably secured over a lens portion of the optical means 12, and a connecting portion 26.

As seen from FIGS. 2 and 5, the cap portion 24 is cup-shaped, and has an inner cylindrical wall 26 with an inwardly extending radial ridge 28. The connecting portion 26 is flat and elongated, having a first end 30 secured with the cap portion 24 and an enlarged second end portion 32. Attachment means 33 comprises an opening 34 in the extending end portion 32 of the cover body 20 and a screw 36. The screw 36 has a threaded end 38 for engaging a threaded opening 40 at a raised region 42 of the optical body 12 at a location intermediate its lens portions 14 and 16. The screw 36 has an enlarged retaining top 44 and an intermediate portion 46 of reduced size with an elongated or oval cross-section as clearly shown in FIGS. 3 and 4. The opening 34 comprises a longitudinally extending slit 48 and an oval shaped cut-out portion 50 conforming to the cross-sec tion of the intermediate portion 48 of the screw 36 shown in FIG. 3.

When the binoculars are in use with the protective cover 10 removed from the lens portion, each of the cover bodies 20, 22 extends downwardly intermediate the lens portions 14, 16 as illustrated by the cover body 20 shown in FIG. 1. In this case, the cap portions 24 of the bodies 20 and 22 are in alignment, one being in front of the other. In this condition, the oval cut out portions of each of the openings 34 of the cover bodies 20 and 22 are in longitudinal alignment with the elongated direction of the oval cross-section of the intermediate portion 46 of the retaining screw 36 as shown in FIG. 3. The movement of either cover body 20, 22 in the clockwise or counterclockwise direction about the retaining screw 36 is resisted, and the cover bodies 20, 22 are urged towards and maintained in their vertical intermediate position away from the lenses 18 of the binoculars, thus preventing obstruction of the lenses.

When the lenses 18 are to be covered, the cover body 20 may be moved in either direction such as the counter clockwise direction illustrated by the arrow 52, so that its cap portion 24 overlies the lens 18 of the lens portion 14. The cap portion 24 may then be snapped over the lens portion 14 to enclose and seal the lens 18 as illustrated in FIG. 5 for the cover body 22. In doing this, the ridge 28 of the cap portion 24 snaps over a complimentary ridge 54 extending radially from the outer cylindrical surface 56 of the lens portion 14 for retaining the lens cap 24 in position, which action is especially useful after the lens caps have become worn or expanded from usage. An extending tab 58 is also provided for each of the cap portions 24 to assist in removing the caps by breaking the seal with their lens portions.

In a similar manner, the other cap portion 24 of the cover body 22 may be moved in the clockwise direction from its vertical position for enclosing lens 18 of the lens portion 16 of the binoculars. When the cap portions 24 are displaced from their uncovered positions to their positions covering the lenses 18, such movements are resisted and result in the enlargement of the openings 34, as illustrated in FIG. 4 with respect to the cover body 20. It is noted that when the cover body 20 is removed from its lens portion and is displaced in the clockwise direction, as illustrated by the arrow 60, of FIG. 4, the opening 34 reduces in size and acts to urge the movement of the cover body 20 into its vertical position shown in FIG. 3 and to retain the cover body in this position. This retention prevents undesired movements of the cover body 20 from its vertical position. The movement of the other cover body 22 in the counter clockwise direction upon its removal from the lens portion 16 also results in actions similar to those described in connection with the cover body 20.

It will thus be seen that the objects set forth above, among those made apparent from the preceding description, are efficiently attained and, since certain changes may be made in the above means without departing from the scope of the invention, it is intended that all matter contained in the above description shall be interpreted as illustrative and not in a limiting sense.

What is claimed is:

1. A protective cover for an optical means having an exposed lens portion comprising a cover body having a lens cap portion for being removably secured over the lens portion of an optical means and a connecting portion extending from the cap portion, and attachment means for securing the connecting portion of the body with the optical means and allowing movement of the cap portion between a first position proximate to the lens portion and a second position away from the lens portion, the attachment means urging the body toward its second position upon being displaced therefrom, the lens cap portion is cup shaped for being received over the rim of the lens portion of the optical means and the connecting portion is flat and elongated having a first end portion secured with the cap portion and extending second end portion, and the attachment means is provided by an elongated opening in the second end portion of the connecting portion and a screw means attached to the optical means and having a portion with an elongated cross-section received through the elongated opening of the connecting portion, the elongated cross-section of the screw means being in alignment with the elongated opening of the connecting portion of the body when the body is in its second position and the body being urged toward its second position when displaced therefrom.

2. The protective cover of claim 1 in which the body is of a resilient material and the cap portion is provided with a cylindrical inner surface for being received over the lens portion of an optical means and which surface has an inwardly extending radial ridge for interengaging a radial ridge of the lens portion of the optical means.

3. The protective cover of claim 2 in which the opening in the second end portion of the connecting portion is an elongated slit with an oval shaped cut-out portion which conforms substantially to the elongated cross-section of the portion of the screw means received therethrough.

4. The protective cover of claim 3 in which the cap portion received over the lens portion of the optical means forms a seal therewith, and the cap portion is provided with a tab for assisting in the removal of the cap portion from the lens portion of the optical means.

5. A protective cover for a binocular optical means having a pair of exposed lens portions which are spaced apart comprising first and second cover bodies each having a lens cap portion for being removably secured over one of the lens portions of a binocular optical means and a connecting portion extending from the cap portion, and attachment means for securing each of the connecting portions of the bodies to the optical means at a location intermediate its lens portions and allowing respective movement of each of the cap portions between a first position proximate to one of the lens portions and a second position away from and intermediate the lens portions of the optical means, the attachment means urging each of the bodies towards its second position upon its being displaced therefrom, the lens cap portion of each of the bodies is cup shaped for being received over the rim of a respective one of the lens portions of the optical means, and the connecting portion is flat and elongated having a first end portion secured with its cap portion and an extending second end portion, and the attachment means comprises an elongated opening in the second end portion of each of the connecting portions and a screw means secured with the optical means and having a portion with an elongated cross-section received through the elongated openings of the connecting portions, the elongated cross-section of the screw means being in alignment with the elongated openings of the connecting portion of each of the bodies when the bodies are in their second positions with the bodies being urged toward their second positions when they are respectively displaced therefrom.

6. The protective cover of claim 5 in which the bodies are of a resilient material and the cap portions of the bodies are each provided with a cylindrical inner surface for being received over a respective one of the lens portions of the optical means and which surface has an inwardly extending radial ridge for interengaging a radial retaining ridge of the lens portion.

7. The protective cover of claim 6 in which the opening in the second end portion of each the connecting portions of the bodies is an elongated slit with an oval shaped cut-out portion which conforms substantially to the elongated cross-section of the portion of the screw means received therethrough.

8. The protective cover of claim 7 in which the cap portion of each of the cover bodies received over the lens portions of the optical means forms a seal therewith, and each of the cap portions is provided with a tab for assisting in the removal of the cap portion from the lens portion of the optical means.

* * * * *